United States Patent
Narayanan et al.

(10) Patent No.: US 8,553,977 B2
(45) Date of Patent: Oct. 8, 2013

(54) CONVERTING CONTINUOUS TONE IMAGES

(75) Inventors: Raman Narayanan, Seattle, WA (US); Radoslav Petrov Nickolov, Bellevue, WA (US); Ming Liu, Redmond, WA (US); Rajendra Vishnumurthy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 12/946,137

(22) Filed: Nov. 15, 2010

(65) Prior Publication Data

US 2012/0121175 A1 May 17, 2012

(51) Int. Cl.
*G06K 9/00* (2006.01)

(52) U.S. Cl.
USPC ........... 382/166; 382/162; 382/167; 382/274; 348/453

(58) Field of Classification Search
USPC ................. 382/162, 166, 167, 274; 348/453; 345/621, 593, 596–597, 600–601, 604, 619
See application file for complete search history.

(56) References Cited

U.S. PATENT DOCUMENTS

| | | | |
|---|---|---|---|
| 5,903,676 A | 5/1999 | Wu et al. | |
| 5,919,249 A | 7/1999 | Herbstman et al. | |
| 6,020,897 A | 2/2000 | Carlsen et al. | |
| 6,049,390 A | 4/2000 | Notredame et al. | |
| 7,081,892 B2 | 7/2006 | Alkouh | |
| 2003/0043390 A1 | 3/2003 | Fritz et al. | |
| 2006/0001679 A1* | 1/2006 | Hamburg | 345/620 |
| 2007/0198932 A1* | 8/2007 | Uchimura | 715/723 |
| 2008/0095470 A1* | 4/2008 | Chao et al. | 382/298 |
| 2008/0126993 A1* | 5/2008 | Fujii et al. | 715/840 |
| 2009/0115798 A1* | 5/2009 | Shimada et al. | 345/621 |

OTHER PUBLICATIONS

Carpentieri, et al., "Lossless Compression of Continuous-Tone Images", Retrieved at << http://ieeexplore.ieee.org/stamp/stamp.jsp?tp=&arnumber=892715 >>, Proceedings of the IEEE, vol. 88, No. 11, Nov. 2000, p. 1797-1809.

"Graphics Jargon", Retrieved at << http://www.angelfire.com/anime3/internet/graphics.htm >>, Retrieved Date: Aug. 19, 2010,pp. 9.

* cited by examiner

*Primary Examiner* — Ali Bayat
(74) *Attorney, Agent, or Firm* — Microsoft Corporation (57) ABSTRACT

One or more techniques and/or systems are disclosed for converting an unsupported continuous tone image file with an opacity layer to an application supported image. An opacity mask is created from an extracted alpha channel portion of the unsupported image file, where the alpha channel comprises transparency (opacity) information for the image. The unsupported image file can comprise an eight-bit alpha channel that indicates transparency for one or more portions of the image. The remaining channels of the unsupported image, after the alpha channel is extracted, can be used to create an image, which is combined with the opacity mask, to generate a supported image with a transparency layer.

20 Claims, 7 Drawing Sheets

CONVERTING CONTINUOUS TONE IMAGES

BACKGROUND

In a computing environment, digital images can be rendered on a plurality of devices, in a variety of formats. For example, digital cameras, scanners, and/or other imaging devices can generate digital images of physical and/or created objects. Typically, the digital images are arranged for display as a two-dimensional arrangement of pixels, where respective pixels have color values (e.g., red, green, and blue color channel values), and in some formats, additional alpha channel values, such as transparency. Digital images may be displayed, created, stored and/or transferred in a variety of formats, such as bitmap (BMP), graphics interchange format (GIF), joint photographic experts group (JPEG), tagged image file format (TIFF) and portable network graphics (PNG), just to name a few. However, not all applications support the respective formats, and some formats are better suited for particular types of images.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Image formats such as JPEG work well for continuous tone, photographic images; while formats such as PNG may be more appropriate for high frequency data (e.g., having high contrast between edges and/or colors) like text and vector graphics. A JPEG image file can use three color channels, respectively having eight bits of image data (twenty-four bits). A PNG image file can comprise a fourth set of eight bit data, indicative of a transparency layer, which may enhance the resulting image displayed. However, JPEG format, among others, are more often used for continuous tone images, such as for images of scenery, people, and other images that may comprise a mixture of various colors with low contrast (frequency) between edges and colors. Alternately, for example, the PNG format, among other, is more often used for computer-generated images that comprise high contrast (frequency) between edges and colors, such as computer generated images of text.

While the PNG-type formats can comprise support for per-pixel alpha channels, where the alpha channel can comprise transparency (opacity) information for the image, newer image formats, such as JPEG2000, also comprise a per-pixel alpha channel and works well with continuous tone images. However, when using the newer image formats (e.g., JPEG2000) in computer applications that only support web standard format (JPEG, PNG, GIF etc.), for example, they need to be converted to a format that supports the alpha channel, such as PNG. But, converting to PNG format for continuous tone image can cause images to dramatically increase in size, such as from six-hundred kilobytes to six thousand kilobytes (e.g., ten times or more).

Accordingly, one or more techniques and/or systems are disclosed that provide for conversion of an image in an unsupported format (e.g., unsupported in an application such as a browser) to an image in a supported format. Further, the converted image can comprise a high compression ratio for a continuous tone image, while supporting a per-pixel alpha channel, such as for an opacity layer. The higher compression ratio may provide for a smaller storage footprint (e.g., in memory or non-transient storage on a server) and improved transmission speeds, such as between a server and client.

In one embodiment for converting an unsupported continuous tone image file with an opacity layer to an application supported image, an opacity mask is created from an extracted alpha channel portion of the unsupported image file, where the alpha channel comprises transparency (opacity) information for the image. Further, an image can be combined (e.g., layered) with the opacity mask, where the image comprises a remaining portion of the unsupported image file after the alpha channel is extracted, such as red, green and blue color channels, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for conversion of unsupported images (e.g., unsupported in webpages) to supported image formats. Further, the converted images can have a desired compression (e.g., high compression ratio) while supporting a per-pixel alpha channel, such as for an opacity layer. That is, for example, webpages typically support PNG, JPEG, GIF, and some other image formats. While PNG comprises alpha-channel support, the compression ratio may not be desirable for storing and sending from servers to clients.

One or more techniques and/or systems, described herein, may allow for alpha-channel support for web-based images, for example, while providing desired compression ratios.

Figure 1:
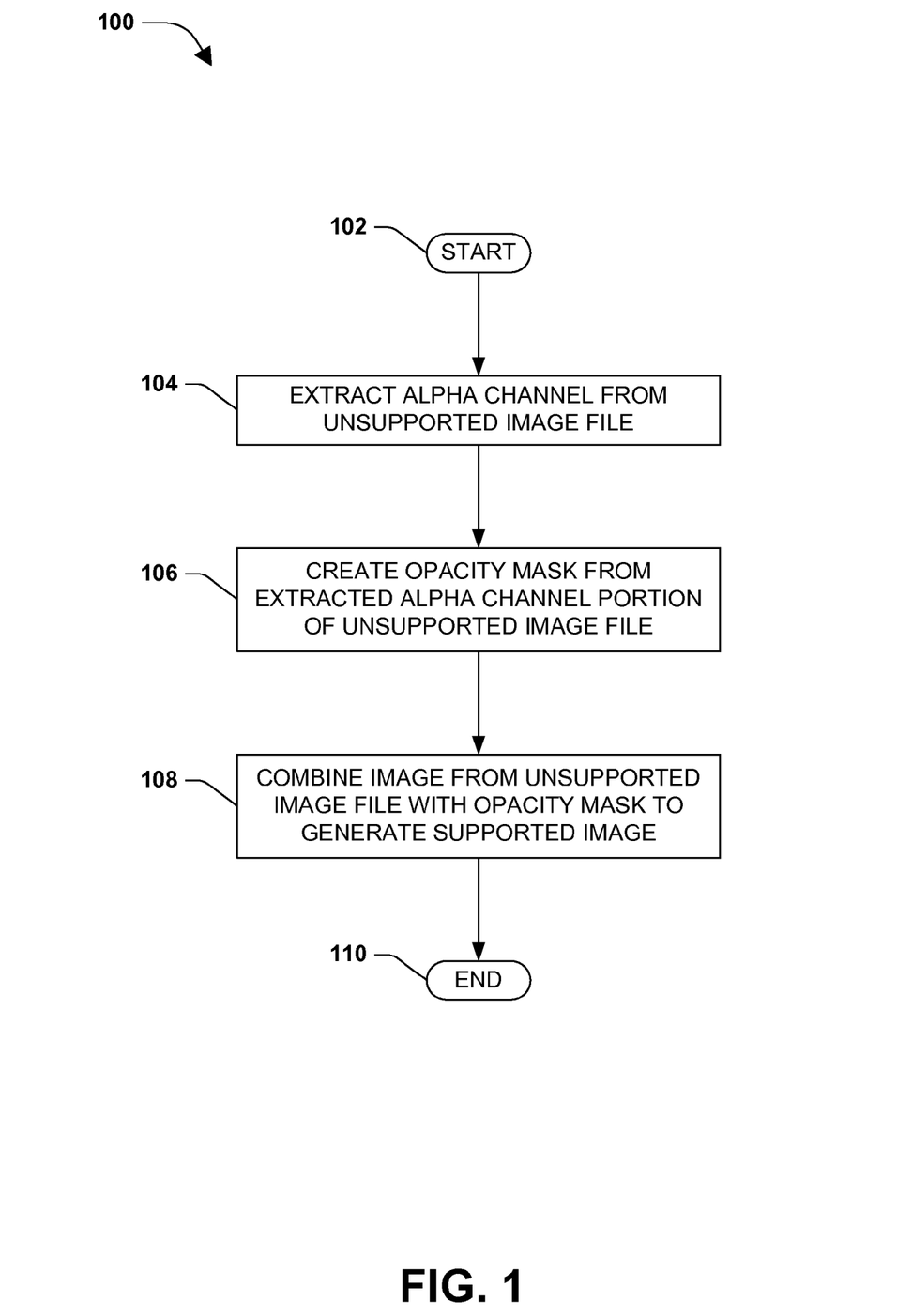
FIG. 1 is a flow diagram of an exemplary method for converting an unsupported continuous tone image file with an opacity layer to an application supported image.

FIG. 1 is a flow diagram of an exemplary method 100 for converting an unsupported continuous tone image file with an opacity layer to an application supported image. The exemplary method 100 begins at 102 and involves extracting an alpha channel from an unsupported image file, at 104. For example, a digital photographic image is commonly a continuous tone image, where respective colors at any pixel in the image comprise a single tone, and where a gradient of tones are continuous (unbroken) between black and white. It will be appreciated that extracting an alpha channel may comprise extracting a channel of a specific bit depth (e.g., 2 bits, 4 bits, etc.), where the extracted channel comprises an opacity channel for the unsupported image file. It will also be appreciated that while continuous tone images are referenced on occasion herein, that such referencing is not meant to be interpreted in a limiting sense. Rather, continuous tone images are merely mentioned to illustrate one example to which the instant disclosure may have application, but the instant disclosure is not limited to merely this application, for example.

Further, for example, when a client requests an image from a server, such as when a browser requests a webpage comprising the image, the image is downloaded from the server to the client. In this example, an image file that comprises a higher compression ratio may be able to be downloaded from the server to the client more quickly than one with a lower compression ratio. However, image files that are supported in web-based documents (e.g., webpages rendered in browsers) and that have higher compression ratios tend to comprise less image data.

For example, a JPEG image format typically does not provide for storage of transparency data. For example, an image stored using the JPEG format can use a red, green, blue (RGB) color scheme, using three 8-bit channels to represent the red, green and blue color components. The PNG image format can support per-pixel transparency data such that an image using a red, green, blue, alpha (RGBA) color scheme can be stored in the PNG format, where an additional eight bit set of data can be used to represent the transparency layer. The additional transparency data (e.g., alpha channel) may be used to enhance the resulting image displayed. However, JPEG format, among others, is typically configured and/or optimized in a manner such that it is more often used for continuous tone images, such as for images of scenery, people, and other images that may comprise a mixture of various colors with low contrast (frequency) between edges and colors. Alternately, for example, the PNG format, among others, is more often used for computer-generated images that comprise high contrast (frequency) between edges and colors, such as computer generated images of text.

Further, when compression is performed on a continuous tone image in a format that is better suited for high frequency images, such as PNG, the resulting file tends to be very large. Therefore, if a high frequency image file is used for a continuous tone image, such as to include the fourth set of image data (e.g., transparency layer), transmission of the very large, compressed file may result in a delayed download experience, such as to a client side browser, for example. Additionally, while browsers may support both image format types (e.g., JPEG and PNG), most continuous tone images are comprised in the low-frequency image formats (e.g., JPEG). However, there are other continuous tone formats that comprise a transparency layer (e.g., JPEG-200), but these formats are not generally supported by browsers, for example.

In one embodiment, the transparency layer can be extracted from the unsupported image file, where the transparency layer comprises the alpha channel of the image file. In this embodiment, the alpha channel can comprise the fourth channel, which comprises the eight bits describing the transparency layer. In the exemplary method 100, at 106, an opacity mask can be created from the extracted alpha channel portion of the unsupported image file. For example, the extracted alpha channel comprises information that can be used to create the opacity mask, which represents the transparency layer for the image.

An opacity mask is a mask, for example, that can be described by a bitmap of pixels in the image, where respective pixels comprise an opacity (or transparency) value corresponding to the extracted alpha channel information. The mask can be applied to portions of an image to make an object in the image partially or completely transparent. In one embodiment, an opacity mask can use the alpha channel information to specify how source pixels of the object are blended into a final destination target object. Transparent portions of the mask can indicate areas of a corresponding image that are transparent or hidden, whereas opaque portions of the mask can indicate areas of a corresponding image that are visible (or vice versa depending on calibration settings, for example).

At 108 in the exemplary method 100, an image is combined with the opacity mask, where the image comprises a remaining portion of the unsupported image file after the alpha channel is extracted. In one embodiment, contents of the opacity mask can be mapped to elements (e.g., pixels) of the image. For example, the opacity value, from the mask, for respective pixels can be used to determine a resulting opacity of the corresponding pixels of the image. In this example, if a given portion of the mask is transparent, the corresponding portion of an element or visual in the image can be transparent. Further, if a given portion of the mask is opaque, the opacity of the corresponding portion of the element or visual in the image can be unchanged. In this way, for example, a supported image is generated that comprises the transparency layer of the unsupported image file.

Having combined the image from the unsupported image file with the opacity mask to generate a supported image, the exemplary method 100 ends at 110.

Figure 2:
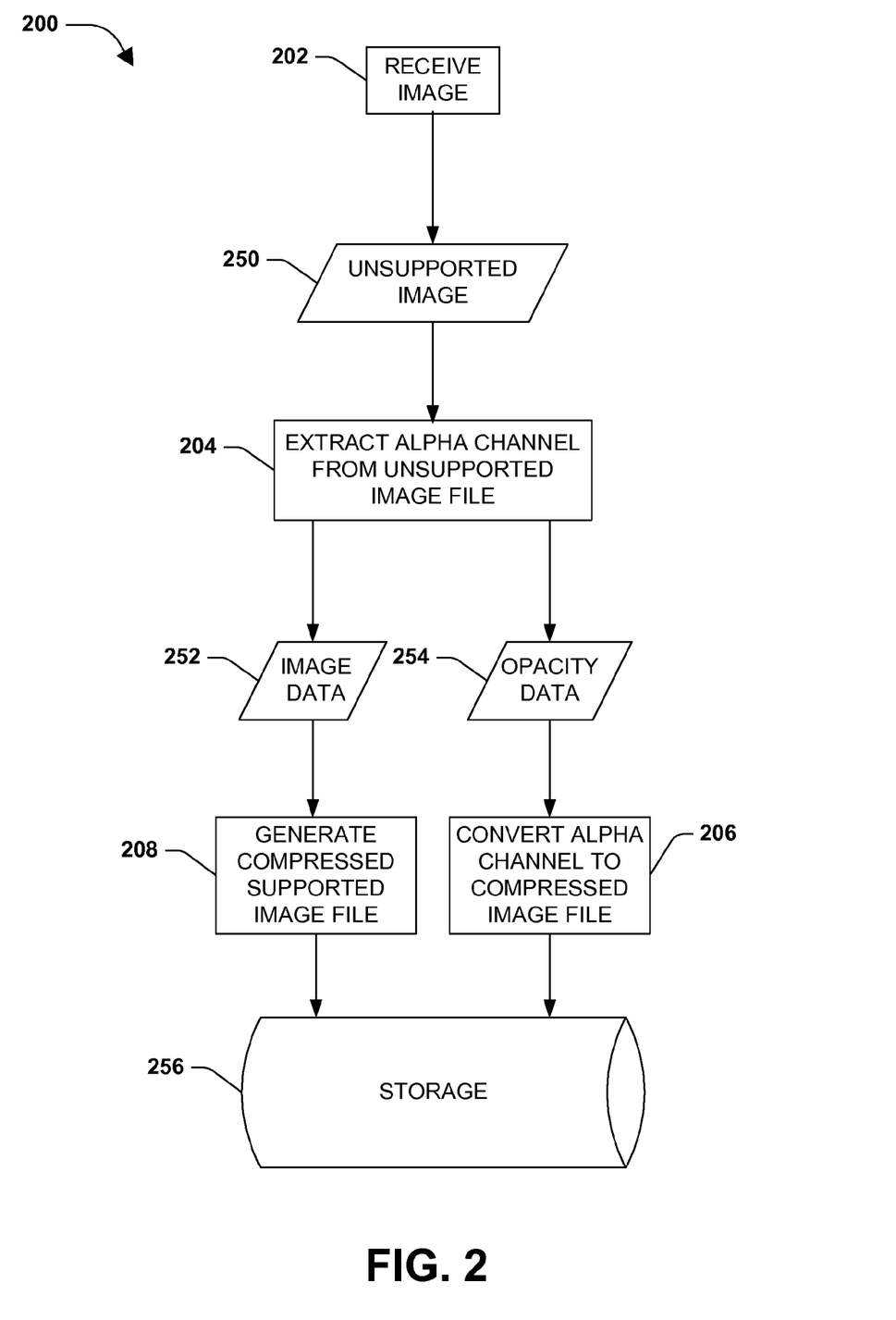
FIG. 2 is a flow diagram illustrating an example embodiment of a method where one or more techniques described herein are implemented.

FIG. 2 is a flow diagram illustrating an example embodiment 200 of a method where one or more techniques described herein are implemented. At 202, an image can be received, such as by a system employing one or more techniques described herein. For example, a server that compiles image files and/or image data (e.g., a location of an image file, and/or metadata associated with the image) can receive the image, such as when an image is uploaded to the server.

As an illustrative example, Internet-based search engines commonly compile images from servers, clients, and/or websites connected to the Internet. In this example, a web-crawler can search the Internet for images and upload identified images to a server for the search engine. As another illustrative example, web-sites commonly comprise images that are displayed when users navigate to the web-site. Further, the contents of the website, including the images, can be uploaded to a website hosting server, such as by the website designer.

At 204 in the exemplary embodiment 200, if the received image comprises an unsupported image 250 (e.g., an image format that may not supported in one or more browsers), an alpha channel can be extracted from the unsupported image file 250. In one embodiment, extracting the alpha channel can comprise extracting an eight-bit channel that comprises an opacity channel for the unsupported image file. For example, the unsupported image file 250 can comprise a thirty-two bit color format, where twenty-four bits comprise the information for the RGB colors, and eight bits comprise the alpha channel that indicates the opacity data 254 for the image. It will be appreciated that the bit lengths and/or colors mentioned herein are not to be interpreted in a limiting sense, but are merely presented as examples. That is, bit lengths other than eight, twenty-four and/or thirty-two (e.g., 2, 4, etc.) and/or color schemes other than RGB (e.g., CMYK, grayscale, etc.) are equally applicable to the disclosure herein.

Further, when the opacity data is extracted 254 from the unsupported image file 250, the remaining image data 252 can comprise image data, such as the RGB color information for the image, which may be used to generate an image. In one embodiment, an image file can be generated from the remaining portion of the unsupported image file after the alpha channel is extracted. For example, an image file that comprises a continuous tone image having a high compression ratio format (e.g., JPEG) can be generated from the remaining red, green and blue channels, comprising twenty-four bit of image color data.

In one embodiment, the image data 252 and opacity data 254 can be stored, such as in a server storage 256 (e.g., in memory or non-transient storage). At 206, the extracted alpha channel can be stored as an image file, by creating a first compressed image file that comprises the alpha channel portion of the unsupported image file. Further, at 208, the image file can be created and compressed, creating a second compressed image file that comprises the remaining portion of the unsupported image file; and the second compressed image file can also be stored as a supported image file (e.g., supported in a browser).

For example, an advantage of separating the alpha channel and RGB channels from the unsupported image 250 is that the resulting separated data (e.g., opacity data 254 and image data 252) can be respectively compressed at a higher compression ratio than a compression of the unsupported file, particularly for continuous tone images, for example. As described above, an image file in a thirty-two bit format that comprises four channels (e.g., red, green, blue color channels and the alpha channel) has a lower compression ratio for continuous tone images than that of a twenty-four bit format file comprising three channels (e.g., RGB). Further, the image file in a thirty-two bit format has a much lower compression ratio than that of an eight bit image file comprising one channel (e.g., alpha channel).

In one embodiment, the extracted alpha channel portion of the unsupported image can be stored as an image file, such as a compressed opacity data. In another embodiment, the extracted alpha channel portion of the unsupported image can be stored as an opacity function. For example, the data extracted from the alpha channel of the unsupported image 250 that indicates the opacity data for the unsupported image 250 can be represented as an algorithm, formula, mathematical equation, and/or pattern, etc.

As an illustrative example, transparency information for an image can be applied by a creator of the image, such as to apply special affects to the objects in the image. In this example, the image creator may wish to block out one or more portions of one or more objects in the image, and/or allow one or more portions of an underlying object o be visible through an overlying object. Commonly, image creators can use an existing transparency pattern, or create a customized transparency pattern for the image. In this illustrative example, the transparency pattern may be comprised in the alpha channel of the unsupported image, which can be extracted and stored as a function that yields the desired transparency pattern.

Figure 3:
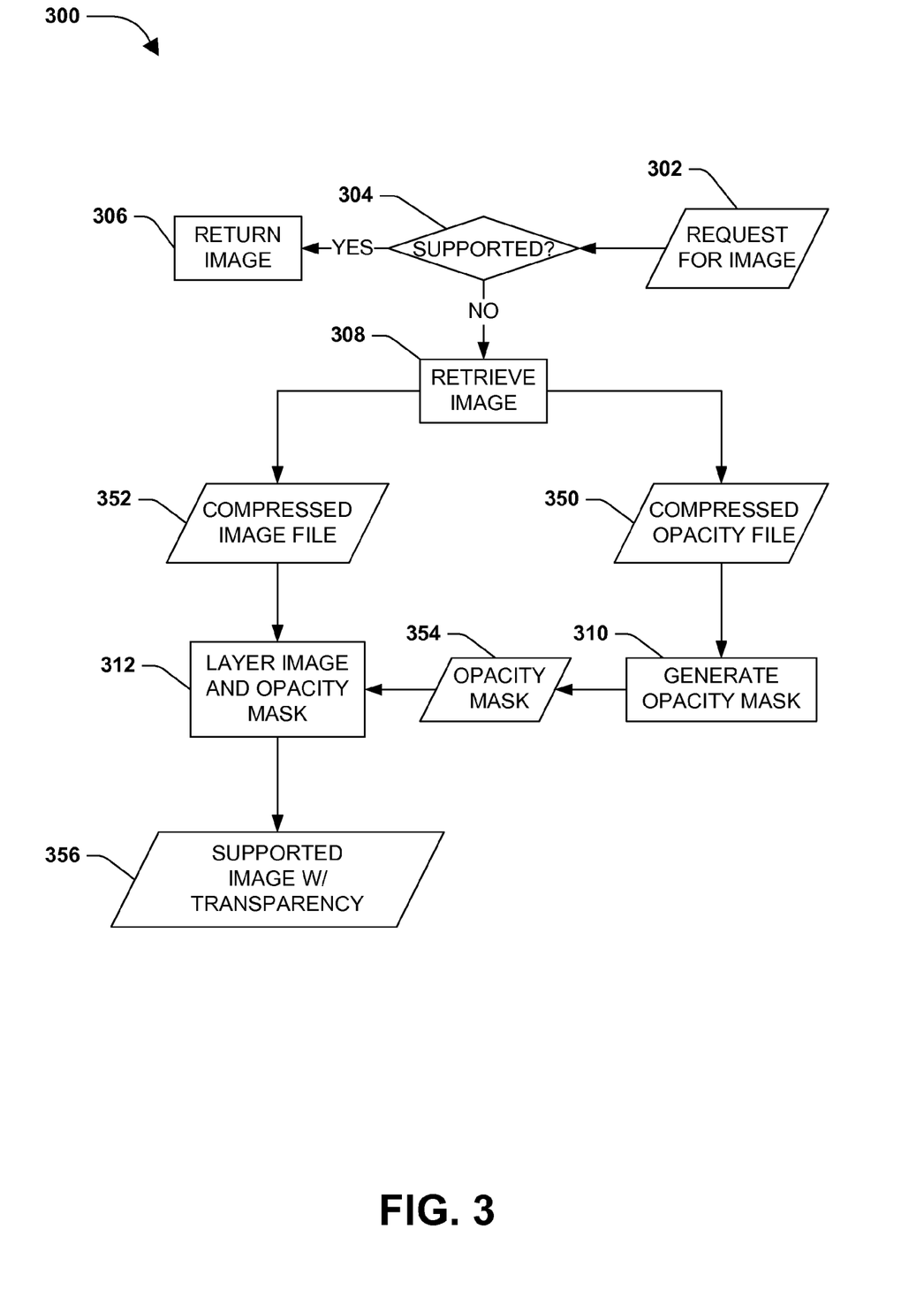
FIG. 3 is a flow diagram illustrating an example embodiment of a method where one or more techniques described herein may be implemented.

FIG. 3 is a flow diagram illustrating an example embodiment 300 of a method where one or more techniques described herein may be implemented. A request 302 for an image is received, for example, at a location where the requested image is stored and/or location information for the image is stored (e.g., in a database that identifies a storage location). As an illustrative example, when a user navigates their browser to a webpage that comprises a continuous tone image (e.g., digital color photograph of outdoor scenery), a server that is hosting the webpage content may receive the request for the image so that it can be downloaded to the browser.

At 304, it can be determined whether the requested image is supported in the browser, for example, in an image format that can be rendered in the browser. If the format of the image is supported (YES at 304) the supported image can be returned in response to the request 302, for example, by sending a compressed image file of the supported image to the client machine running the browser. Alternately, if the format of the requested image is not supported (NO at 304) the unsupported image can be retrieved, such as from storage, at 308.

In one embodiment, as described above, the unsupported image can be pre-processed, for example, by storing the separated alpha channel information in a compressed format, and the RGB channel information as a compressed image file. In another embodiment, the unsupported image may be retrieved from an identified storage location, and the channel separation processing can be done "on-the-fly." For example, when the request for the image 302 is received, the unsupported image may be retrieved in response to the request; the alpha channel information (opacity data) can be separated and compressed; and the image file of the remaining portion of the unsupported image can be created and compressed (e.g., as in 202-208 of FIG. 2).

In this embodiment, a compressed image file 352, comprising the remaining portion of the unsupported image after the alpha channel is extracted and a compressed opacity file 350 (e.g., or an opacity function), can be received in response to the request for the image 302. In one embodiment, the retrieved image data 352, 350 may come from data storage. In an alternate embodiment, the retrieved image data 352, 350 may come in response to the request "on-the-fly."

In one embodiment, the extracted alpha channel portion of the unsupported image file, such as the compressed opacity file 350, and the image, such as the compressed image file 352, can be transmitted from a server to a client upon a request from the client for the unsupported image. That is, for example, the browser that is running on the client can request the contents of a webpage loading to the browser from a remote server hosting the website. The remote server can retrieve the image data 352, 350 from its storage, and transmit the compressed files (e.g., image files and/or data files comprising the opacity function) to the client in response to the request.

As an example, another advantage of separating the alpha channel data, comprising the opacity data, from the image, and compressing the separated information using a higher compression ratio than that of the original file, is the resulting compressed files are smaller. That is, for example, because the separated compressed files are smaller than a compressed version of the unsupported file, particularly for continuous tone images, an amount of memory or storage used to store the files is mitigated; and transmission of the resulting compressed files is more efficient (e.g., using less bandwidth). As a result, for example, the end user experience may be enhanced by providing faster download time for the unsupported images, such as when rendering a webpage in a browser.

Further, in one embodiment, the image comprised in the unsupported image file can be created on a client side from the extracted alpha-channel portion of the unsupported image 350 and the image file 352 for use by the application, such as in the browser to render the webpage. In one embodiment, the unsupported image file (e.g., 202 of FIG. 2) can be converted to a supported image file format for use by the application on the client side.

At 310 in the example embodiment 300 of FIG. 3, an opacity mask 354 is generated from the opacity data, such as comprised in the compressed opacity file 350. As described above, the opacity mask can indicate an opacity (or transparency) value, corresponding to the extracted alpha channel information, for respective pixels in the image. For example, the opacity mask 354 can be applied to portions of the image 352 to make object in the image partially or completely transparent.

At 312, the image file 352 and opacity mask 354 are combined by layering the image over the opacity mask (e.g. or vice versa) to generate a supported image file 356 that comprises transparency. That is, for example, some image formats that provide for a transparency (opacity) layer, and are also configured to provide high compression ratios for continuous tone images (e.g., JPEG-2000) are not supported in most browsers. In this embodiment, images in the unsupported file formats, comprising an alpha channel (e.g., thirty-two bits of data) can be converted to images supported by the application, and that also utilize the transparency layer.

Figure 4:
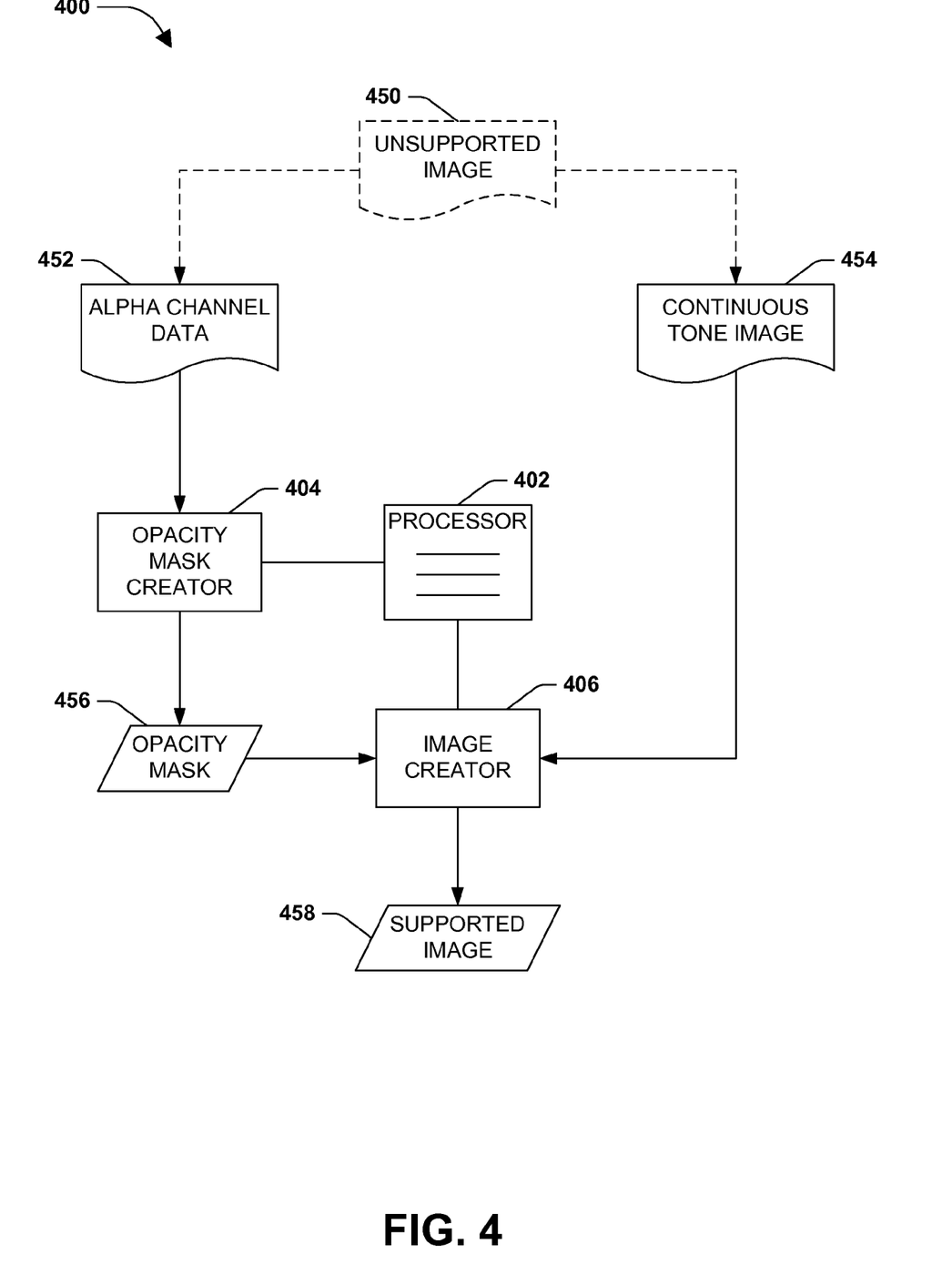
FIG. 4 is a component diagram of an exemplary system for converting an unsupported image file to a supported image comprised in the unsupported image file.

A system may be devised that can convert images files that are unsupported in an application, for example, into image formats that are supported in the application. Further, the converted images can have a high compression ratio and support an opacity layer. FIG. 4 is a component diagram of an exemplary system 400 for converting an unsupported image file to a supported image comprised in the unsupported image file.

A processor 402 processes data for the system 400, and an opacity mask creation component 404 is operably coupled with the processor 402. The opacity mask creation component 404 creates an opacity mask 456 for the supported image 458 from alpha channel data 452 comprising an alpha channel extracted from the unsupported image file 450. An image creation component 406 is operably coupled with the processor 402, and is configured to generate the supported image 458 by combining a continuous tone image from the unsupported image file 450 with the opacity mask 456.

Figure 5:
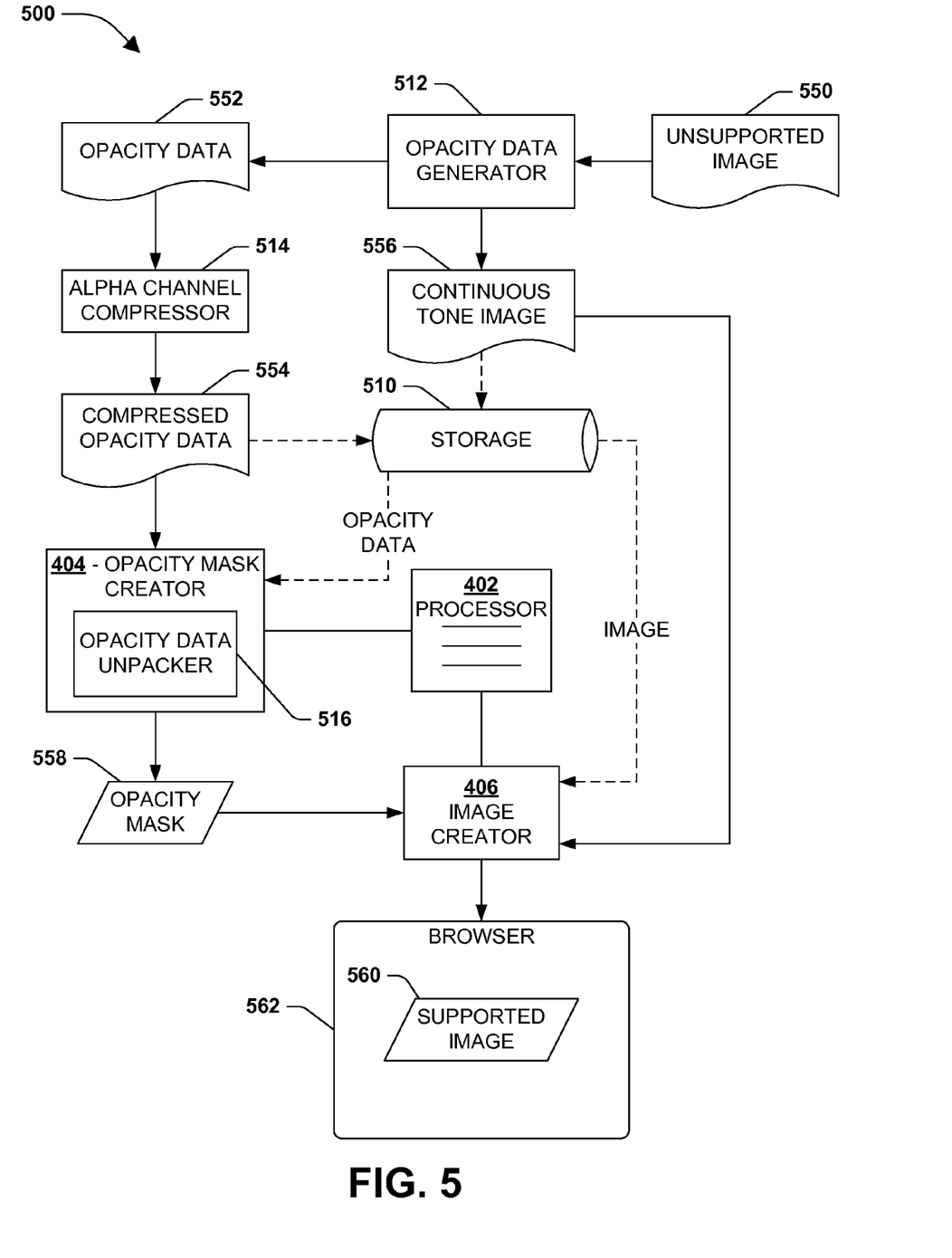
FIG. 5 is a component diagram illustrating an example embodiment where one or more systems described herein can be implemented.

FIG. 5 is a component diagram illustrating an example embodiment 500 where one or more systems described herein can be implemented. An opacity data generation component 512 can extract merely an alpha channel from an unsupported image file 550, for example, thereby generating an image file 556 from the remaining portions of the unsupported image, such as comprising twenty-four bit color channels RGB. In one embodiment, the opacity data generation component 512 can create an opacity data image file 552 from the extracted alpha channel, which comprises merely a transparency layer from the unsupported image, for example. In another embodiment, the opacity data generation component 512 can create (e.g., in lieu of and/or in addition to opacity data image file 552) an opacity data function from the extracted alpha channel, where the opacity data function can indicate the opacity data (e.g., as a transparency layer) for the unsupported image 550.

An alpha channel compression component 514 can create a compressed opacity data image file 554 from the extracted alpha channel, such as the opacity data file 552 or opacity data function. In one embodiment, the opacity data image file 554 can comprise compressed data that is indicative of an eight-bit opacity channel from the unsupported image file 550. In one embodiment, the continuous tone image from the unsupported image file, which may be comprised in a continuous tone image file 556, can comprise compressed data indicative of twenty-four bit color channels from the unsupported image file 550.

In one embodiment, the compressed opacity data 554 and the continuous tone image file 556, such as comprised in a compressed image file, can be stored in an image data storage component 510, which stores opacity data and the continuous tone image file. As an example, the unsupported image file 550 can be pre-processed (e.g., prior to a request for the unsupported file), such that the opacity data is extracted, and the separate compressed opacity data file and continuous tone image file are stored (e.g., in anticipation of a request for the unsupported image file).

In another embodiment, the opacity data generator may extract the opacity data 552 from the unsupported image 550 in response to the request, "on-the-fly." That is, the request for the unsupported image 550 is retrieved (e.g., from a storage location) and the opacity data generator 512 can extract the alpha channel in real-time (e.g., responding to the request at the time of the request), and the opacity data 552 can be compressed and transmitted "on-the-fly," for example, along with the compressed continuous tone image file 556.

In the example embodiment 500, the opacity mask creation component 404 can comprise an opacity data unpacking component 516 that unpacks data from the opacity data image file 554 indicative of the alpha channel extracted from the unsupported image file 550. Further, in this embodiment, the opacity mask creator 404 can create the opacity mask 558 from the unpacked data, and the image creation component 406 can combine the continuous tone image (e.g., transmitted "on-the-fly," and/or from the storage component 510) with the opacity mask 558 to generate a supported image 560.

In one embodiment, the supported image 560 can comprise an image file supported by a browser 562, for example, where the browser sends a request to a remote server to provide the unsupported image (e.g., a website hosting server). In another embodiment, the supported image 560 can comprise a browser plug-in application, such as a web-application that is instantiated in the browser. In this way, for example, the browser 562 and/or browser plug-in can render continuous tone images that may be unsupported, but have been converted to supported images that have high compression ratios and can utilize a transparency layer.

Figure 6:
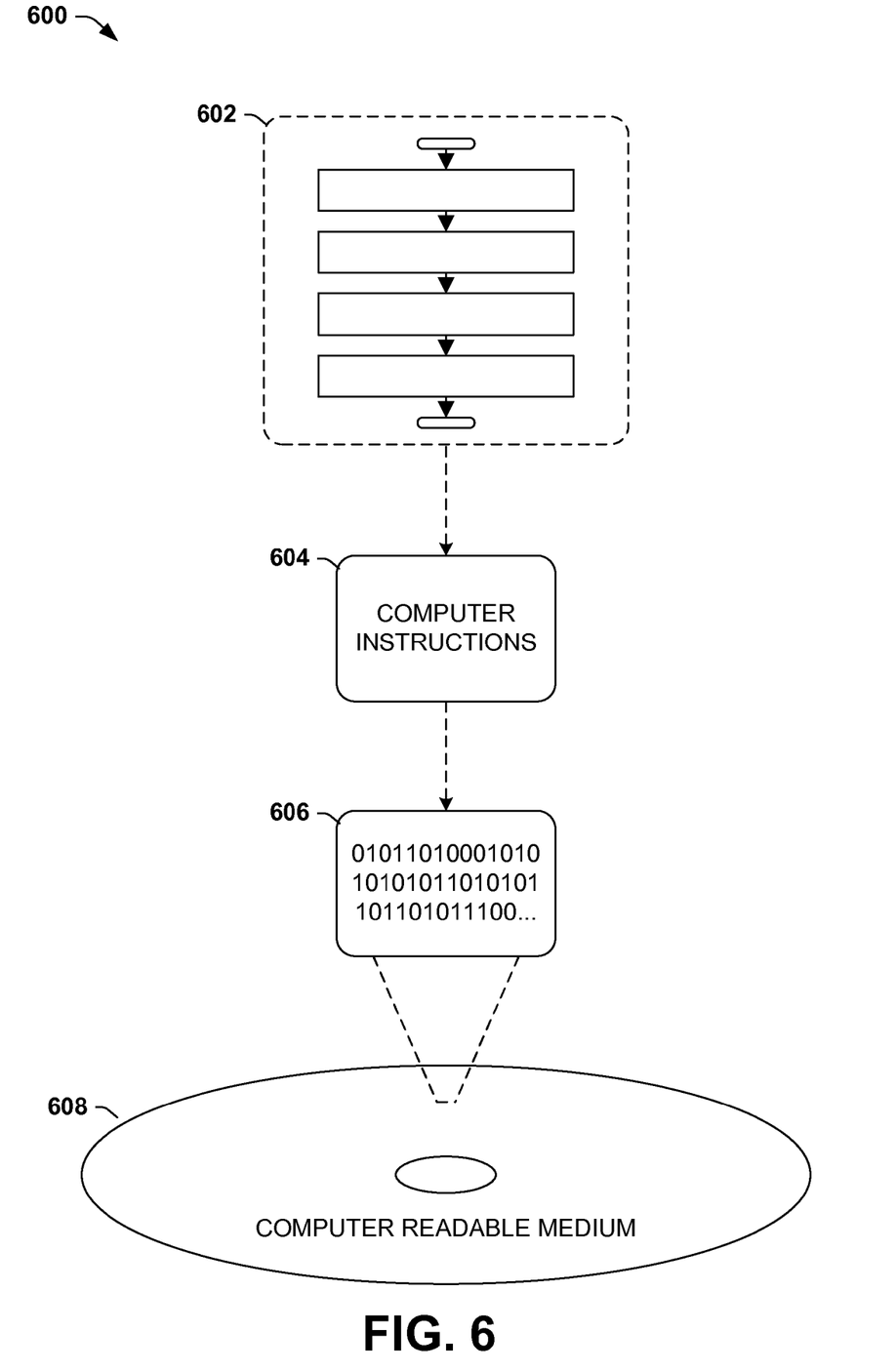
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary method 100 of FIG. 1, for example. In another such embodiment, the processor-executable instructions 604 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
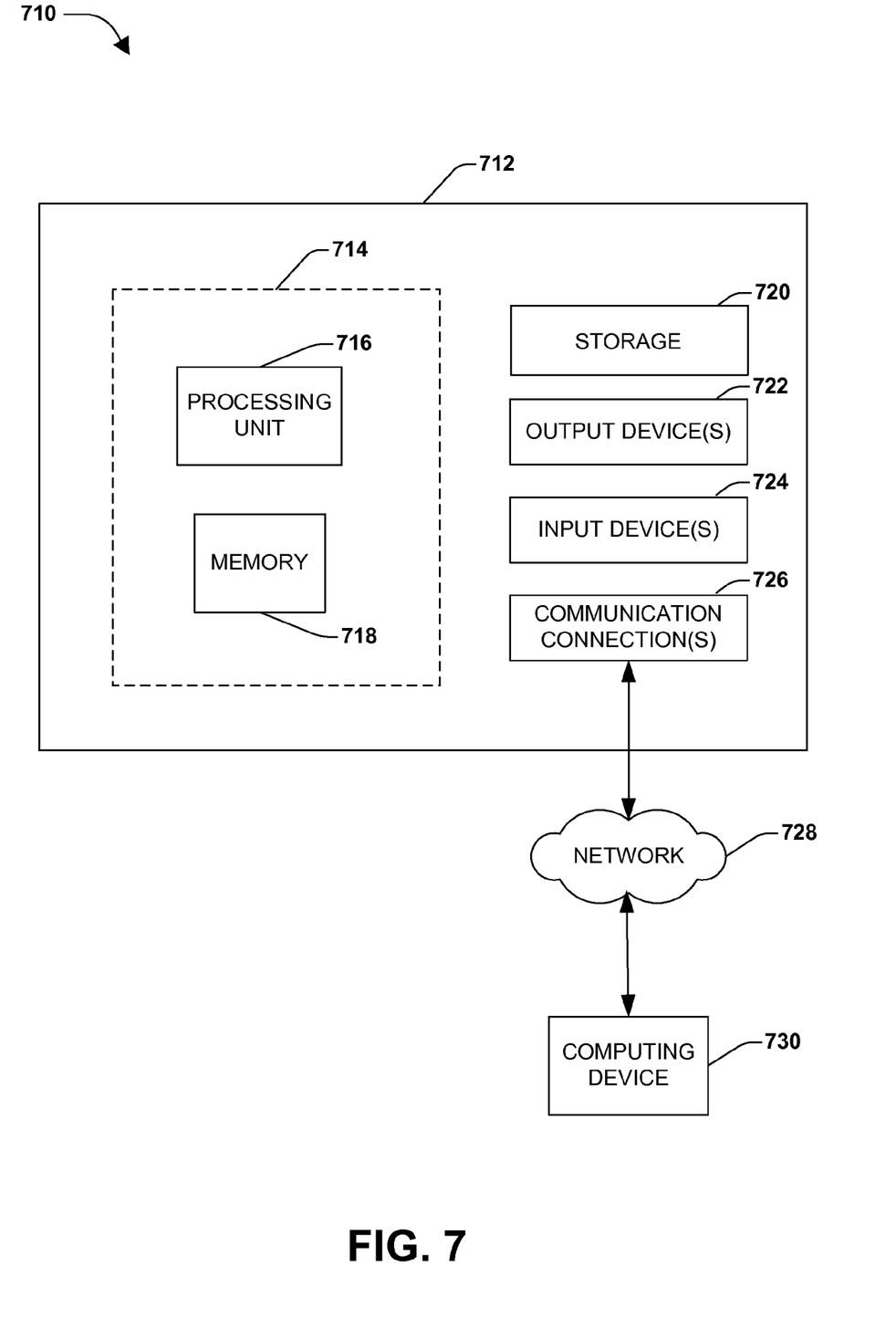
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for converting an image file, comprising:
    extracting an alpha channel portion of the image file;
    creating an opacity mask from the extracted alpha channel portion of the image file; and
    combining an image with the opacity mask, where the image comprises a remaining portion of the image file after the alpha channel portion is extracted, at least one of:
        extracting the alpha channel portion comprising extracting an eight-bit channel comprising an opacity channel for the image file;
        a first file created, where the first file comprises the alpha channel portion of the image file;
        the image created from the remaining portion of the image file after the alpha channel portion is extracted;
        a second image comprised in the image file generated on a client side from the extracted alpha channel portion of the image file, the second image for use by an application; or
        the extracted alpha channel portion of the image file and the image transmitted from a server to a client upon a request from the client for the image file.

2. The method of claim 1, comprising:
    storing the extracted alpha channel portion of the image file as one of:
        a first image file; or
        an opacity function.

3. The method of claim 1, the image file not supported by a first application.

4. The method of claim 1, the first file comprising a compressed first image file.

5. The method of claim 1, the image file comprising at least one of a PNG file, a JPEG file, a JPEG2000 file, or a GIF file.

6. The method of claim 1, comprising creating a second image file from twenty-four bit image data comprising image color channels.

7. The method of claim 1, comprising creating a second image file that comprises the remaining portion of the image file.

8. The method of claim 1, the combining comprising layering the opacity mask over the image to generate a second image file.

9. The method of claim 1, comprising converting the image file on a server side for use by the application on the client side.

10. The method of claim 1, the application comprising a browser.

11. The method of claim 1, the application comprising a browser plug-in.

12. A system for converting an image file, comprising:
    a processor configured to process data for the system;
    an opacity data generation component configured to extract an alpha channel from the image file;
    an opacity mask creation component configured to create an opacity mask for a first image from the alpha channel extracted from the image file; and
    an image creation component configured to generate the first image by combining a second image from the image file with the opacity mask, at least one of:
        a first file created from the extracted alpha channel;
        a second file comprising compressed data indicative of an eight-bit opacity channel of the image file;
        the second image comprised in a third file comprising compressed data indicative of one or more color channels of the image file; or the opacity mask creation component comprising an opacity data unpacking component configured to unpack data from a fourth file indicative of the alpha channel extracted from the image file.

13. The system of claim 12, the opacity data generation component configured to perform one or more of:
   create an opacity data image file from the extracted alpha channel; or
   create an opacity data function from the extracted alpha channel.

14. The system of claim 12, the first file comprising a compressed opacity data image file.

15. The system of claim 12, the second file comprising an opacity data image file.

16. The system of claim 12, the third file comprising a second image file.

17. The method of claim 12, the fourth file comprising an opacity data image file.

18. The system of claim 12, comprising an image data storage component configured to store opacity data.

19. The system of claim 12, the first image supported by one or more of:
   a browser; or
   a browser plug-in.

20. A non-modulated data signal computer-readable storage medium storing instructions that when executed, perform a method for converting an image file, comprising:
   extracting an alpha channel from the image file comprising extracting an opacity channel;
   creating a first image file from the extracted alpha channel;
   creating a second image file from a remaining portion of the image file after the alpha channel is extracted, the second image file created from image data comprising one or more image color channels;
   creating an opacity mask from the first image file; and
   combining an image from the second image file with the opacity mask, comprising layering the image from the second image file over the opacity mask to generate a second image.

* * * * *